(12) United States Patent
Kim et al.

(10) Patent No.: US 9,517,403 B1
(45) Date of Patent: Dec. 13, 2016

(54) REWARDING USER CUSTOMIZATION OF A VIRTUAL ITEM BASED ON USER REVIEWS IN AN ONLINE GAME

(71) Applicant: KABAM, INC., San Francisco, CA (US)

(72) Inventors: John Kim, San Francisco, CA (US); Kevin Lee, Fremont, CA (US); Kevin Chanthasiriphan, San Francisco, CA (US); Steven Martin, Vancouver (CA)

(73) Assignee: Kabam, Inc., San Francisco, CA (US)

( * ) Notice: Subject to any disclaimer, the term of this patent is extended or adjusted under 35 U.S.C. 154(b) by 351 days.

(21) Appl. No.: 14/135,297

(22) Filed: Dec. 19, 2013

(51) Int. Cl.
*A63F 13/00* (2014.01)

(52) U.S. Cl.
CPC .................. *A63F 13/00* (2013.01)

(58) Field of Classification Search
USPC ........................................... 463/6, 31
See application file for complete search history.

(56) References Cited

U.S. PATENT DOCUMENTS

| | | | |
|---|---|---|---|
| 2009/0327043 A1 | 12/2009 | Sekhon | 705/10 |
| 2012/0156668 A1 | 6/2012 | Zelin | 434/362 |
| 2012/0215773 A1 | 8/2012 | Si et al. | 707/723 |
| 2013/0178257 A1* | 7/2013 | Langseth | G06T 17/05 463/4 |
| 2016/0155187 A1* | 6/2016 | Paulrajan | G06Q 30/0643 705/27.2 |

OTHER PUBLICATIONS

"Rewarding Users—Facebook Developers", printed from http://developers.facebook.com and Facebook Like Button Reward—Reward Users for Linking Your Page:, Enlightenmental Productions, printed from http://www.enlightenmental.com, Jul. 4, 2013, 7 pages.

* cited by examiner

*Primary Examiner* — Pierre E Elisca
(74) *Attorney, Agent, or Firm* — Sheppard Mullin Richter & Hampton LLP (57) ABSTRACT

A system and method for rewarding user creation of customized virtual items are disclosed. Rewards may be determined for distribution to a user creator of customized virtual item based on reviews by other users of a virtual space. The reward determination may be based on the user reviews breaching at least one reward criteria. In some examples, the reward criteria may include a number of votes indicating whether the user reviewers like or dislike the customized virtual item created by the user creator. In some examples, the customized virtual item under review may include a customized virtual space race car. In some instances, reviews may be received for the customized virtual space race car for determination of a reward separate and distinct from a reward based on a race result achieved in a virtual space car race.

18 Claims, 4 Drawing Sheets

REWARDING USER CUSTOMIZATION OF A VIRTUAL ITEM BASED ON USER REVIEWS IN AN ONLINE GAME

FIELD OF THE DISCLOSURE

This disclosure relates to providing rewards to users in an online game, the rewards being provided based on user reviews of user customization of virtual items in the online game.

BACKGROUND

Rewarding users in online games are known. Generally, rewards are typically provided to winners in the online games for completing in-game activities and/or for achieving in-game milestones. Facilitating users to customize virtual items in online games is generally known. For example, in some online games, users are enabled to create visual effects on virtual items associated with the users.

SUMMARY

One aspect of the disclosure relates to rewarding user customization of a virtual item based on reviews provided by other users in an online game. Users of the online game may be facilitated to review customization of virtual items created by other users. Rewards may be determined for distribution to creators of the customized virtual items based on corresponding user reviews. The determined rewards may include, but not limited to, game points, power-up abilities, virtual items, virtual currencies, real-world money credits, and/or any other types of rewards. The reward determination for a given user customization of virtual item may be based on user reviews of the given user customization breaching one or more reward criteria.

In some examples, the user reviews based on which rewards are determined may include those reviewing user customization of virtual space race cars in the online game. In those examples, the reviews may include contents indicating "like" or "dislike" of a given customized virtual space race car by the user reviewers, ratings, scores, style points, grades assigned to the given customized virtual space race car by the user reviewers, comments on the given customized virtual space race car provided by the user reviewers, and/or any other types of review contents. In one example, the user reviewers providing such reviews may include participants of a virtual space race in which the given customized virtual space race car competes. The reward(s) determined based on such user reviews in those examples may be separate and distinct from that determined based on a race result (e.g., finishing position, time and/or any other race result) achieved by the given customized virtual space race car in the given virtual space race. This may enhance social interaction for the users of the online game. This may incentivize generation of content in the online game as the users may be motivated to create popular customization of virtual items for receiving rewards.

A system configured for rewarding user creation of customized virtual items may include a server. The server may operate in a client/server architecture with one or more client computing platforms. The client computing platforms may be associated with the users of the virtual space. The server may be configured to execute one or more of a space component, a user component, a virtual item customization component, a virtual item review component, a reward component, and/or other components.

The space components may be configured to execute an instance of the virtual space in which an online game takes place. The space component may facilitate user interaction with the virtual space by receiving user commands from client computing platforms associated with the users of the online game. Within the instance of the virtual space executed by the space component, users may create, pick up, trade, purchase, loot, be gifted or otherwise acquire virtual items. The virtual items associated with a given user of the virtual space executed by the space component may facilitate user interaction with the virtual space, interaction with other users, participation in quests, campaigns, missions, and/or any other user activities provided by the virtual space.

The user component may be configured to access and/or manage one or more user profiles and/or user information associated with users of the system. The user information may indicate inventories of virtual items available to the individual users in the virtual space. An inventory of virtual items associated with a given user may list virtual objects, virtual resources, virtual space characters and/or units associated with the given user or under control of the user and/or any other virtual space elements associated with the given user at a given time. The user information managed by the user component may include first user information including information indicating a first user inventory of virtual items associated with a first user in the virtual space.

The virtual item customization component may be configured to facilitate users to create customized virtual items using virtual items in the user inventories associated with the users. For such facilitation, the virtual item customization component may provide virtual tools, templates, models, parts, and/or other resources to enable users to customize the virtual items by augmenting the virtual items. The virtual tools may include, but not limited to, picture editing tools, color palates, 3D tuning tools, paint tools, parts selection tool, 2D or 3D free draw tools, pattern selection tools, and/or any other virtual tools that may enable user customization of the virtual items. Such virtual tools may be made available for use by a given user in a graphical user interface implemented on a client computing platform associated with the given user. The graphical user interface may include field controls that facilitate the given user to use the virtual tools to customize virtual items in the user inventory associated with the given user.

In some implementations, the virtual item customization component may be configured to facilitate users to customize virtual space race cars in the online game. In those implementations, the virtual item customization component may provide virtual space race car components for selection by users to augment virtual space race cars associated with the users. Such virtual space race car components may include, without limitation, various styles of wheels, front bumper, rear bumper, sides, front lights, rear lights, top spoilers, hood, winds, mirrors, radiator, tinted glass, packs, vinils, neon and/or any other virtual space race components that may be used to customize virtual space race cars. Such virtual space race car components may be provided in a graphical user interface for selection by a given user to customize a virtual space race car associated with the given user. In some implementations, the virtual item customization component may facilitate the user to freely draw on the surface of a given virtual space race car to create body art.

The virtual item review component may be configured to receive reviews of user customization of virtual items. The reviews received by the virtual item review component may include reviews made by fellow users of the online game. For a given customized virtual items created by a user creator, the virtual item review component may receive a set of reviews of the given customized virtual item from by one or more user reviewers. In some implementations, the virtual item review component may be configured such that the reviews received for a given customized virtual item may include votes submitted by user reviewers. Such votes may indicate whether respective user reviewers like or dislike the given customized virtual item.

In some examples, the virtual item review component may be configured such that reviews of a given customized virtual item received by the virtual item review component comprises review contents corresponding to one or more review parameters. In some implementations, the virtual item review component may be configured with programming rules to parse a given review for extracting the review contents corresponding to the review parameters. The review parameters may comprise, without limitation, a rating parameter specifying a user reviewer rating of the given customized virtual item; a ranking parameter specifying a user reviewer ranking of the given customized virtual item; a score parameter specifying a user reviewer generated score for the given customized virtual item; a style rating for specifying a user rating of a style for the given customized virtual item; and/or any other review parameters.

In some implementations, the virtual item review component may be configured to receive reviews made by the user reviewers reviewing customized virtual space race cars created by user creators. Such reviews may indicate a general approval (e.g., "like") or disapproval (e.g., "dislike") by the user reviewers towards customized virtual space race cars created by the user creators; may include overall scores grades or ratings, appeal index, overall exterior styling judgment, ratings for specific components augmented onto the virtual space race car as customization, score or rating for body art created by the user for customizing the virtual space race car, comments, and/or any other review parameters.

In some examples, the reviews received by the virtual item review component for a given virtual space race cars may include those made by participants of virtual car races in the virtual space. Such participant reviewers may include users associated with virtual space race cars that compete in the virtual car races (e.g., reviews from the contestants in the virtual car races); may include spectators of the virtual car races; may include administrators or moderators in the online game that organize the virtual car races; may include one or more user judges employed in the virtual car races; and/or may include any other participants of the virtual car races. Reviews of virtual space race cars competing in virtual space race may be received from such participants during, at conclusion, and/or after a virtual car race.

The reward component may be configured to determine rewards for distribution to user creators of the customized virtual items based on corresponding user reviews received by the virtual item review component. The reward module may be configured to dynamically determine whether reviews of a given virtual item customized by a given user have breached the one or more reward criteria. A reward table may be used by the reward component for determining which reward(s) may be distributed to a user creator according to user reviews of a customized virtual item created by that user creator breaching a given reward criteria. In some examples, the different rewards determined by the reward component for the user reviews breaching different reward criteria may correspond to different amounts of virtual currency, real-world money credit, virtual resources, virtual items and/or any types of rewards.

In some implementations, the determination of breaching reward criteria by user reviews of a given customized virtual items may be made by the reward component by assessing the user reviews. Such assessment by the reward component may include accounting for values corresponding to one or more review parameters included in those in the reviews. For example, the assessment of the user reviews for a given customized virtual item may include determining a number of positive votes (e.g., "likes" or "thumb up") submitted by the user reviewers; a number negative votes (e.g., "dislikes" or "thumb down") submitted by the user reviewers; a total of score, grade or rating assigned by the user reviewers; an average score, grade or rating assigned by the user reviewers; a number of style points assigned by the user reviewers; and/or accounting of values corresponding to any other review parameters.

In some implementations, for determining a reward, the reviews for the given customized virtual item may be weighed based on various aspects about the respective user reviewers. For example, the reward component may be configured to weigh reviews made by user reviewers that have demonstrated to provide credible user reviews of customized virtual items in the past. In that example, the reward component may be configured to keep track of historical reviews by the user reviewers; to build user review profiles based on the historical reviews; and dynamically assign and/or adjust user review credit scores assigned to the individual user reviewers.

In some examples, rewards determined by the reward component may include those based on user reviews of customized virtual space race cars created by user creators. In those examples, such rewards may be separate and distinct from a reward or rewards awarded to users based on race results achieved by the virtual space race cars, e.g., finishing positions achieved by the virtual space race cars at conclusion of a virtual car race.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
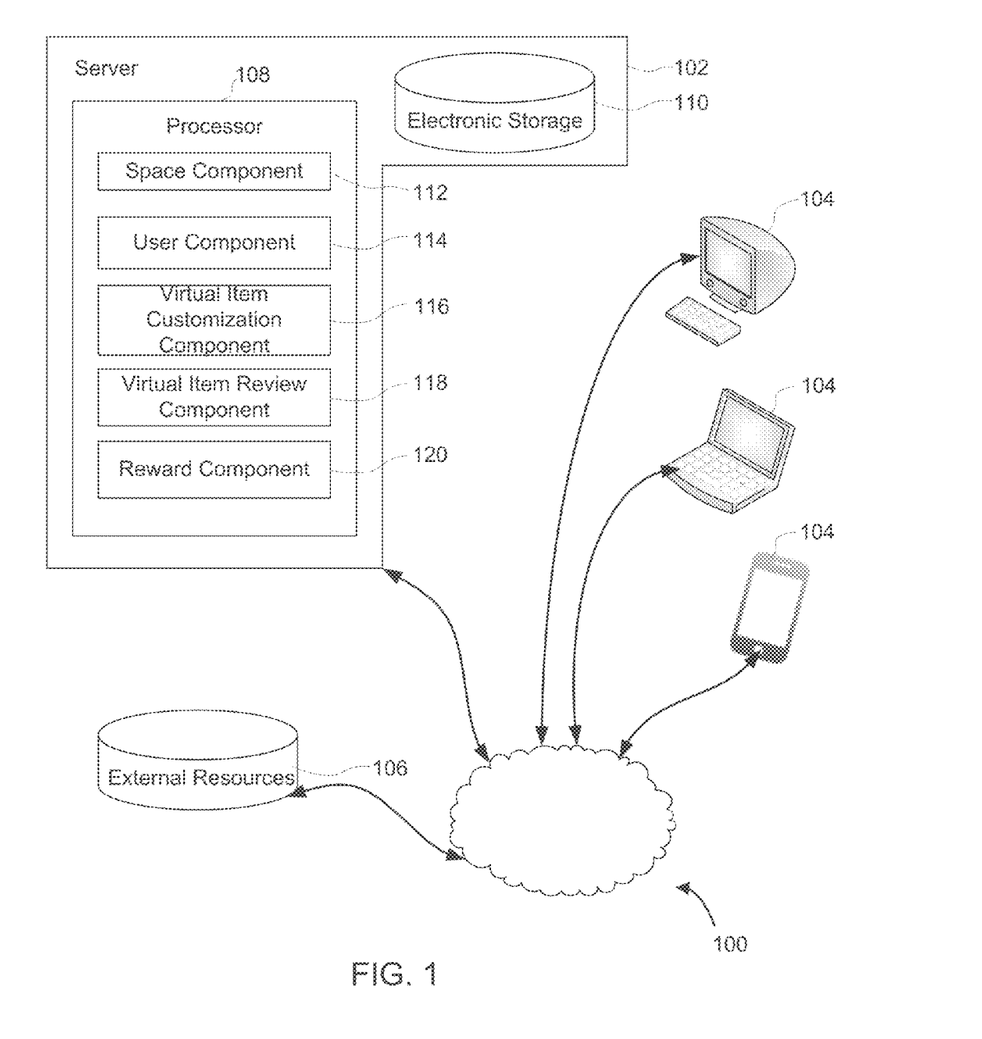
FIG. 1 illustrates a system for rewarding user creation of customized virtual items in accordance with the disclosure.

FIG. 1 illustrates a system 100 for rewarding user creation of customized virtual items in accordance with the disclosure. Providing the virtual space may include hosting the virtual space over a network. In some implementations, system 100 may include a server 102. The server 102 may be configured to communicate with one or more client computing platforms 104 according to a client/server architecture. The users may access system 100 and/or the virtual space via client computing platforms 104. The server 102 may comprise a processor 108 configured to execute computer readable instructions to implement system components. The computer program components may include one or more of a space component 112, a user component 114, a virtual item customization component 116, a virtual item review component 118, reward component 120, and/or other components.

The space components 112 may be configured to execute an instance of the virtual space in which an online game takes place. Within the instance of the virtual space, the users may interact with virtual space elements and/or with each other through gameplays provided by the online game. The gameplays may include role-playing, first-person shooter, real-time strategy, turn-based strategy, simulation, music or rhythm playing, social interaction, twitching and/or any other gameplays. The execution of the instance of the virtual space by space component 112 may include determining the state communicated (e.g., via streaming visual data, via object/position data, and/or other state information) from server 102 to client computing platforms 104 for presentation to users. The state determined and transmitted to a given client computing platform 104 may correspond to a view for a user character being controlled by a user via the given client computing platform 104. The state determined and transmitted to a given client computing platform 104 may correspond to a location in the virtual space. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The instance of the virtual space may comprise a simulated space that is accessible by users via clients (e.g., client computing platforms 104) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

The instance of the virtual space may comprise virtual space entities automatically controlled in the instance of the virtual space. Such virtual space entities may not be associated with any user. As such, the automatically controlled virtual space entities may be generated and/or developed by artificial intelligence configured with the server 102 by a provider, administrator, moderator, and/or any other entities related to the virtual space. These automatically controlled entities may evolve within the virtual space free from user controls and may interact with the entities controlled by or associated with the users, other automatically controlled virtual space entities and as well as the topography of the virtual space. Certain manifested traits may be associated with the automatically controlled entities in accordance with the artificial intelligence configured with the server 102. As an illustration, the manifested traits of the automatically controlled virtual space entities may include physical appearances such as age, attire, facial expression, speech style and pattern, response style in reaction to user's interaction, gesture and/or any other traits. As used herein, such automatically controlled virtual space entities in the instance of the virtual space are referred to as "AI entities".

The above description of the manner in which state of the virtual space is determined by space component 112 is not intended to be limiting. The space component 112 may be configured to express the virtual space in a more limited, or richer, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance of the virtual space executed by space component 112, resources may be, for example, generated, cultivated, mined, harvested, purchased, earned, traded and/or gifted over time by units, characters, pets, buildings, facilities and/or any other infrastructure or entity in the virtual space for the user. Resources may be prospected. Resources may be virtual items of value that can be accumulated through participation in the virtual space, rather than virtual items that can only be bought or virtual currencies that may be used to facilitate store and exchange of values in the virtual space. Resources may be virtual items that are accumulated en masse and then used to satisfy resource requirements in the virtual space. By way of non-limiting examples, virtual space resources may include food (e.g., rice, fish, wheat, etc.), wood, minerals (e.g., good, iron, ore, coal, oil, stone, crystal, etc.), plants, animals, virtual items, virtual currencies, and/or any other resources appropriate for the virtual space. Transfer of resources between users may be reflected through user inventories such that the transferor user's inventory reduces an amount of the transferred resources that are added to the transferee user.

Within the instance(s) of the virtual space executed by space component 112, the users may participate in the instance of the virtual space by controlling one or more of an element in the virtual space. The user controlled elements may include avatars, virtual space characters, virtual space units (e.g., troops), objects (e.g., weapons, horses, vehicle and so on), simulated physical phenomena (e.g., wind, rain, earthquakes, and/or other phenomena), and/or other user controlled elements. The user controlled avatars may represent the users in the virtual space. The user characters may include heroes, knights, commanders, leaders, generals and/or any other virtual space entities that may possess strength, skills, abilities, magic powers, knowledge, and/or any other individualized attributes. The virtual space units controlled by the user may include troops and/or any other virtual space entities that may be trained, recruited, captured, and/or otherwise acquired by the users in groups or en mass. Unlike user characters, individual members of a virtual space unit controlled by a given user may share the same strength, skills, abilities, and/or any other attributes. For example, every infantryman in a unit of infantry controlled by a user may have the same attributes in accordance with the characteristics of the unit of infantry. The objects controlled by the users may include weapons, vehicles, projectiles, magic items, wardrobes, boots, armor, knapsacks, medicine, healing portion, and/or any other virtual items that may be employed by the users for interaction with the virtual space.

In any case, the user controlled elements may move through and interact with the virtual space (e.g., AI entities, elements controlled by other users and/or topography in the virtual space). The elements controlled by a given user may be created and/or customized by the given user. The given user may have an "inventory" of virtual goods and/or currency that the given user can use (e.g., by manipulation of a user character or other user controlled elements, and/or other items) within the virtual space.

Controls of virtual elements may be exercised through commands input by the users through client computing platforms 104. The users may interact with each other through communications exchanged within the virtual space. Such communications may include one or more of textual chat, instant messages, private messages, voice communications, and/or other communications. Communications may be received and entered by the users via their respective client computing platforms 104. Communications may be routed to and from the appropriate users through server 102 (e.g., through space component 112).

A given user may input commands with specific parameters through a client computing platform 104 associated with the given user to undertake specific deeds, actions, functions, sphere of actions and/or any other types of interactions within the virtual space. For example, the given user may input commands to construct, upgrade and/or demolish virtual buildings, harvest and/or gather virtual resources, heal virtual user controlled elements, AI entities and/or elements controlled by other users, train, march, transport, reinforce, reassign, recruit, and/or arrange troops, attack, manage, create, demolish and/or defend cities, realms, kingdoms, and/or any other virtual space locations controlled by or associated with the users, craft or transport virtual items, interact with, compete against or along with AI entities and/or virtual space elements controlled by other users in combats, research technologies and/or skills, mine and/or prospect for virtual resources, complete missions, quests, and/or campaigns, exercise magic power and/or cast spells, and/or perform any other specific deeds, actions, functions, or sphere of actions within the virtual space. In some examples, the given user may input commands to compete against elements in an environment within the virtual space—i.e., PvE activities. In some examples, the given user may input commands to compete against each other within the virtual space—i.e., PvP activities.

The space component 112 may be configured to execute user actions to facilitate interaction of the users with the virtual space and/or each other in response to receiving virtual space commands input by the users. Execution of the user action by the space component 112 may produce changes to the virtual space state, which may reflect progresses and/or results of the user actions. In some examples, state changes caused by the execution of the user actions may be recorded in the electronic storage 122 to facilitate persistency throughout the instance of the game space. In some examples, execution of the user actions may not produce persistent changes to the virtual space state (e.g., a user character jumping forward and backward successively may not produce any perceivable game state changes to other users).

The user actions executed by the space component 112 may include combat actions enabling users to direct user entities to compete against AI entities and/or against virtual space elements controlled by other users in combats. The combat actions may include real-time combat actions through which the users may direct user entities (e.g., avatars) to perform maneuvers in real or near-real time; may include turn-based combat actions through which the users may direct user entities (e.g., user character, troops and/or combat equipment) to inflict damages and/or resist damages; may include strategy combat actions through which the users may position the user entities strategically in combats; and/or may include any other types of combat actions.

Within the instance of the virtual space, the users may control virtual space locations to generate revenues, productions, resources, troops, culture, wonders, special units and/or any other types of output enabled by the virtual space locations controlled by the users. The user controlled locations may include virtual space towns, cities, kingdoms, castles, villages, fortresses, land masses, resource cores, and/or any other types of virtual space locations. Typically, through the controlling such virtual locations, the users may grow populations, construct infrastructures, conduct commerce, collect taxes, raise troops, train special units, train knights and/or any other user characters, research technologies, gain skills and/or abilities, and/or undertake any other actions, functions, deeds, sphere of actions as enabled by such virtual space locations. For example, a given user may control multiple cities in the virtual space and the cities may generate revenues to fund the given user activities within the virtual space; may generate troops for defending the cities or attacking other elements in the virtual space; may generate growth in science through research institutes established in those cities; may produce weapons through arsenals established in those cities; may generate production through factories established in those cities; may produce food through farms in those cities and so on.

The users may control resource cores in the virtual space. A resource core is a type of virtual space object that may provide specific raw materials, resources, currencies, substances, and/or any other virtual space elements when harvesting actions are performed by user characters with proper skills, equipment, gears, formulas, time duration, and/or any other harvesting parameters. Resource cores may or may not be visible to the users, depending on the user skills. Resource cores may be depleted due to harvesting actions by users and in some examples may be destroyed in the virtual space. In some examples new resource cores may be created to replace the destroyed ones in the virtual space at times determined by the provider, administrator, moderator, and/or any other entities related to the virtual space. Examples of resource cores may include mines, rivers, wells, oceans, swamp, mountains, forests, boxes, pets, plants, and/or any other virtual space locations or objects.

Within the instance of the virtual space, user controlled avatars, characters, objects (e.g., weapons), and/or any other user controlled elements may be associated with virtual space locations controlled by the users who control these elements. In some examples, such associations may be implicated in the virtual space such that a given user controlled element may be associated with all of the virtual space locations controlled by or associated with the given user. In some other examples, such associations may be implicated in the virtual space such that the given user element may be associated with some of the virtual space location controlled by or associated with the given user as however predefined by the provider, administrator, moderator, and/or any other entities related to the virtual space (e.g., the given user character may be only associated with a location where the user character was originally trained and another a location where the user character is currently being stationed at).

Within the instance of the virtual space, AI entities may be associated with virtual space locations as predefined by the provider, administrator, moderator, and/or any other entities related to the virtual space. For example, an AI character may be associated with a virtual space location such that the AI character is supported by the virtual space location (e.g., through production, resources and/or commerce generated by that virtual space location). The virtual space locations associated with AI entities may be controlled automatically by artificial intelligence configured with server 102 and may evolve in accordance with such artificial intelligence within the virtual space.

Within the instance of the virtual space, levels may be established to facilitate and/or incentivize user advancements. Users may receive virtual points for performing user actions, participating in virtual space activities, interacting with virtual space elements and/or other users, and/or for engaging in any other interactions provided by the virtual space. A user may advance to a next virtual space level when a certain goal has been reached, an end condition has been fulfilled by the user in the virtual space, and/or the virtual points acquired by the user has reached a threshold corresponding to the next level. Advancements in user levels typically result in attribute boosts, skill boosts, resistance boosts, higher status, and/or any other user progressions in the virtual space. In some examples, for different categories of gameplays, skills, abilities, and/or any other areas that may be progressed by users, different levels may be established. For example, experience levels may be established in the virtual space to reflect overall experiences of the users in the virtual space, levels in certain skills may be established to reflect user progressions in acquiring or mastering these skills in the virtual space, and so on.

The user component 114 may be configured to access and/or manage one or more user profiles and/or user information associated with users of the system 100. The one or more user profiles and/or user information may include information stored by server 102, one or more of the client computing platforms 104, and/or other storage locations. The user information may indicate inventories of virtual items available to the individual users in the virtual space. An inventory of virtual items associated with a given user may list virtual objects, virtual resources, virtual space characters and/or units associated with the given user or under control of the user and/or any other virtual space elements of the given user at a given time.

The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users. The user information managed by the user component 114 may include information indicating levels of interaction with the virtual space by individual users. The interaction level of an individual user as indicated in such information may reflect an amount of interaction with the virtual space by the individual user.

The virtual item customization component 116 may be configured to facilitate users to create customized virtual items using virtual items in the user inventories associated with the users. For such facilitation, the virtual item customization component 116 may provide a set of virtual tools, templates, models, parts and/or other resources to enable users to customize the virtual items through augmentation. The virtual tools may include, but not limited to, picture editing tools, color palates, 3D tuning tools, paint tools, parts selection tool, 2D or 3D free draw tools, pattern selection tools, and/or any other virtual tools that may enable user customization of the virtual items. Such virtual tools may be made available for use by a given user in a graphical user interface implemented on a client computing platform 104 associated with the given user. The graphical user interface may include field controls that facilitate the given user to use the virtual tools to customize virtual item in the user inventory associated with the given user. By way of non-limiting example, without limitation, the given user may be facilitated to select a virtual item in his/her inventory and select an option to customize the selected virtual items; responsive to such a selection by the user, a graphical interface may be presented to the user on client computing platform 104 associated with the user; the graphical interface may present a set of virtual tools available for the given user to customize the selected virtual items; along with the set of virtual tools, resources like graphics, art, pictures, images, and/or any other elements representing various components that may be used to augment the selected virtual item may be presented to the given user in the graphical interface.

It should be noted that the graphical interface enabling the given user to customize virtual items associated with the given user may be provided as a part of the virtual space of the online game. For example, such an interface may be a part of the graphical virtual space interface that facilitates user interactions in the virtual space. However, this is not necessarily the only case. In some examples, such a graphical interface may be provided by a program or an application separate from the online game. For example, a virtual item editing program may be provided to the given user such that the given user may customize virtual items associated with the given user even when the given user does not participate in the virtual space. In some other examples, the graphical interface may be implemented using a web browser readable format such that the given user may customize the virtual items in a web browser. For instance, a Flash® interface in a web page associated with the virtual space of the online game is contemplated such that the given user may use the Flash® interface to customize virtual items associated with the users.

In some implementations, a virtual item customized via the virtual item customization component 116 may include one or more of a weapon, a mount or a portion thereof, a vehicle or a portion thereof, a piece of clothing, a uniform, and/or other content in the online game. By way of non-limiting example, race cars may be customized via virtual item customization component 116. Descriptions below of customizations of race cars are not intended to be limiting, and the principles described apply to other types of virtual items customized through virtual customization component 116. In such implementations, the virtual item customization component 116 may provide virtual space race car components that may be selected by users to augment virtual space race cars associated with the users. The virtual space race car components may include, without limitation, different styles of wheels, front bumper, rear bumper, sides, front lights, rear lights, top spoilers, hood, winds, mirrors, radiator, tinted glass, packs, vinils, neon and/or any other virtual space race components that may be used to customize virtual space race cars. Such virtual space race car components may be provided in a graphical user interface for selection by the given user. Upon selection of a given style of a component by the user for augmenting a given virtual space race car in the graphical user interface, the selected component may visually appear on the given virtual space race car such that the selected component appears to be a part of the virtual space race car. In some implementations, the graphical user interface may facilitate the user to change colors of the given virtual space race car. In some implementations, the user may rotate the virtual space race car to a different angle in the graphical user interface such that the different portion of the virtual space race car may be presented in the graphical user interface for user customization. In some implementations, the user may freely draw on the surface on the given virtual space race car to create body art for customization of the virtual space race car. Other customizations for the virtual space race car are contemplated.

The virtual item review component 118 may be configured to receive reviews of user customization of virtual items. The reviews received by the virtual item review component 118 may include reviews made by fellow users of the online game. As used herein, the users who made reviews of customization of virtual items created by other users are referred to as "user reviewers"; and the users who create customization of virtual items are referred to as "user creators". For a given customized virtual items created by a user creator, the virtual item review component 118 may receive a set of reviews of the given customized virtual items made by one or more user reviewers. In some implementations, such reviews for the given customized virtual item may be received from graphical user interface presented to individual user reviewers on client computing platform 104. In some implementations, the virtual item review component 118 may be configured such that the reviews received for a given customized virtual item may include votes submitted by user reviewers. In some examples, the votes received by the virtual item review component 118 may indicate whether respective user reviewers like or dislike the given customized virtual item. In those implementations, graphical user interface may be presented to users enabling the users to cast such votes.

Figure 2:
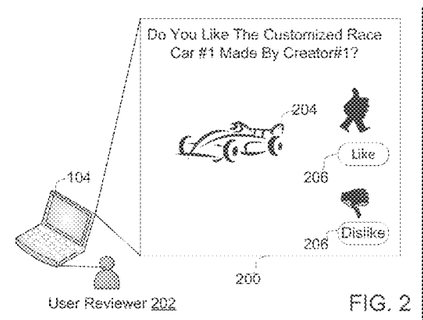
FIG. 2 illustrates one example of a graphical user interface enabling a user reviewer to provide a review of virtual item.

FIG. 2 illustrates one example of a graphical user interface enabling a user reviewer to provide a review of virtual item. It will be described with references with FIG. 1. As shown, the graphical user interface 200 may be implemented on a client computing platform 104 associated with a user reviewer 202. As shown in this example, the review provided by the user reviewer 202 as facilitated by the graphical user interface 200 may include votes indicating whether the user reviewer 202 likes or dislikes a customized virtual item created by a user creator, e.g., such as customized virtual item 204 shown in this example. As illustrated, for enabling the user reviewer 202 to cast such votes, field controls 206 may be provided in the graphical user interface 200. It should be understood, components of graphical user interface 200 shown in this example are merely illustrative. In some other examples, graphical user interface 200 may comprise more or less components than those shown in this example.

Returning to FIG. 1, in some implementations, the virtual item review component 120 may be configured such that reviews of a given customized virtual item received by the virtual item review component 118 comprises review contents corresponding one or more review parameters. In those implementations, the virtual item review component 118 may be configured with programming rules to parse a given review for extracting the review contents corresponding to the review parameters. The review parameters may comprise, without limitation, a rating parameter specifying a user reviewer rating of the given customized virtual item; a ranking parameter specifying a user reviewer ranking of the given customized virtual item; a score parameter specifying a user generated score for the given customized virtual item; a style rating for specifying a user rating of a style for the given customized virtual item; and/or any other review parameters.

Figure 3:
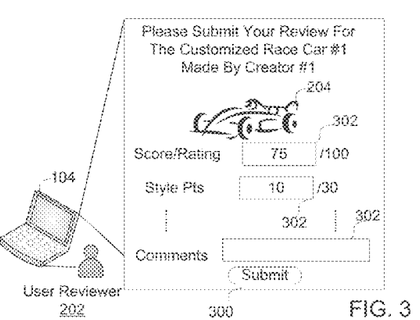
FIG. 3 illustrates another example of graphical user interface enabling a user reviewer to provide a review for a customized virtual item created by a user creator of the virtual space.

FIG. 3 illustrates another example of graphical user interface enabling a user reviewer 202 to provide a review for a customized virtual item created by a user creator of the virtual space. It will be described with references to FIGS. 1-2. As shown in this example, the graphical user interface 300 may be configured to facilitate user reviewer 202 to provide review contents corresponding to various review parameters. As shown in FIG. 2, field controls 302 may be facilitated in the graphical user interface 300 to enable the user reviewer 202 to provide the review contents corresponding to the review parameters. As shown, the field controls 302 may include an input field in which the user reviewer 202 may provide a score or rating for the customized virtual item 204; a input field in which the user reviewer 202 may provide his/her assignment of style points to be associated with the customized virtual item 204; a comment field in which the user reviewer 202 may provide his/her comments for the customized virtual item 204.

Returning to FIG. 1, in some implementations, the virtual item review component 118 may be configured to receive reviews made by the user reviewers reviewing customized virtual space race cars created by user creators. Such reviews may indicate a general approval (e.g., "like") or disapproval (e.g., "dislike") by the user reviewers towards customized virtual space race cars created by the user creators. In some examples, the reviews of the customized virtual space race cars received by the virtual item review component 118 may include overall scores grades or ratings, appeal index (e.g., 3 out of 5 stars for appealing to a given user reviewer), overall exterior styling judgment (e.g., "cool", "sick"), ratings for specific components augmented onto the virtual space race car as customization (e.g., hood, emblem, wings, bumper, window tint, and/or any other components that may be augmented onto the virtual space race car), score or rating for body art created by the user for customizing the virtual space race car, comments, and/or any other review parameters.

In some examples, the reviews received by the virtual item review component 118 for a given virtual space race cars may include those made by participants of virtual car races in the virtual space. Such participant reviewers may include users associated with virtual space race cars that compete in the virtual car races (e.g., reviews from the contestants in the virtual car races); may include spectators of the virtual car races; may include administrators or moderators in the online game that organize the virtual car races; may include one or more user judges employed in the virtual car races; and/or may include any other participants of the virtual car races. By way of non-limiting example, without limitation, reviews of virtual space race cars participating in a given virtual car race in the online game may be received by the virtual item review component 118 during, at the conclusion of, or after the virtual car race; and the reviews may be made by driver users that have virtual space race cars participating in the race, the spectators of the race, the user judges employed in the race, and/or any other participants of the virtual space race.

Figure 4:
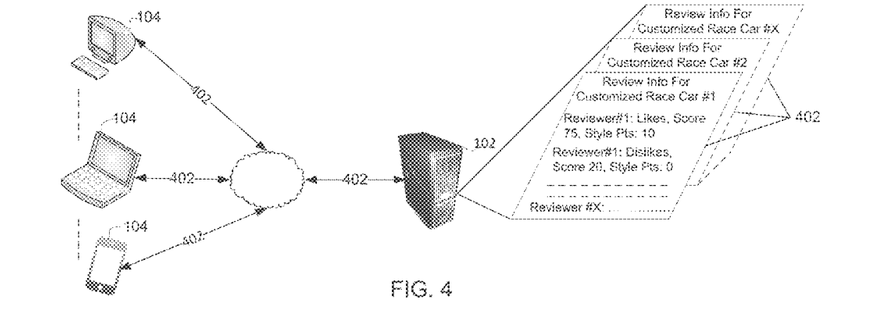
FIG. 4 illustrates one example of user reviews of customized virtual space race cars received by the system shown in FIG. 1.

FIG. 4 illustrates one example of user reviews of customized virtual space race cars received by the system shown in FIG. 1. It will be described with references to FIG. 1. As shown, review information 402 indicating reviews made by user reviewers on customized virtual space race cars may be received from client computing platforms 104 associated with user reviewers. As shown, the received review information may include review information indicating user reviews of a given customized virtual space race car. In this example, as illustrated, the review information 402 includes review contents corresponding to review parameters indicating whether a user reviewer likes the customized virtual space race car, a score given by the user reviewer to the customized virtual space race car, style points given to the customized virtual space race car, and other review parameters. It should be understood the illustration of review information for a given customized virtual space race car in this example is merely illustrative. In some other example, such information may include more or less review contents than those shown in this example.

The reward component 120 may be configured to determine rewards for distribution to user creators of the customized virtual items based on corresponding user reviews received by the virtual item review component. In implementations, for such reward determination, one or more reward criteria may be stored in electronic storage 110 and/or any other network storage location for access by the reward component 120 during runtime of system 100. The reward module 120 may be configured to dynamically determine whether reviews of a given virtual item customized by a given user have breached the one or more reward criteria. In the cases where it is determined by the reward component 120 that at least one of the one or more reward criteria has been breached by the reviews, the reward component 120 may determine a reward for distribution to the given user based on the at least one reward criteria breached by the user. A reward table may be used by the reward component 120 for specifying which reward(s) may be corresponding to a given reward criteria.

By way of non-limiting example, without limitation, the reward component 120 may determine a first reward for distribution to the user creator of a customized virtual item if user reviews of the customized virtual items breach a first reward criteria; a second reward for distribution to the user creator if the user reviews breached a second reward criteria; a third reward for distribution to the user creator if the users reviews breached a third reward criteria; and so on. In some examples, the different rewards determined by the reward component 120 for the user reviews breaching different reward criteria may correspond to different amounts of virtual currency, real-world money credit, virtual resources, virtual items and/or any types of rewards. For example, the first reward in the example described above may include a first amount of real-world money credit (e.g., $10.99), the second reward may include a second amount of real-world money credit (e.g., $7.99); and the third reward may include a third amount of real-world money credit (e.g., $5.99).

The determination of breaching reward criteria by user reviews of a given customized virtual items may be made by the reward component 120 by assessing the user reviews. Such assessment by the reward component 120 may include accounting for values corresponding to one or more review parameters included in those in the reviews. For example, the assessment of the user reviews for a given customized virtual item may include determining a number of positive votes (e.g., "likes" or "thumb up") submitted by the user reviewers; a number negative votes (e.g., "dislikes" or "thumb down") submitted by the user reviewers; a total of score, grade or rating assigned by the user reviewers; an average score, grade or rating assigned by the user reviewers; a number of style points assigned by the user reviewers; and/or any other review parameters.

In some implementations, the reviews for the given customized virtual item may be weighed based on various aspects about the respective user reviewers. For example, the reward component 120 may be configured to weigh reviews made by user reviewers that have demonstrated to provide credible user reviews of customized virtual items in the past. For instance, a positive vote cast by a user reviewer may be multiplied by a user credit score kept track by the reward component 120. In that instance, the reward component 120 may be configured to keep track of historical reviews by the user reviewers; to build user review profiles based on the historical reviews; and dynamically assign and/or adjust user review credit scores assigned to the individual user reviewers. As an example, the reward component 120 may assign a score of 5 credits to a first user reviewer based on his/her historical reviews of customized virtual items; and this score may be multiplied with a positive vote received from that user for reviewing a current customized virtual item such that that 5 positive vote by the first user reviewer may be counted by the reward component 120. By comparison, the reward component 120 may assign a score of 4 credits to a second user reviewer that may have a shorter history of providing reviews of customized virtual items than the first user; and thus a positive vote cast by that user may be counted as 4 positive votes. Still by comparison, a third user reviewer may be assigned with one credit as the third user never provided reviews of customized virtual items in the virtual space; and accordingly, one positive vote cast by the third user may be counted by the reward component 120 as one vote only.

Figure 5A:
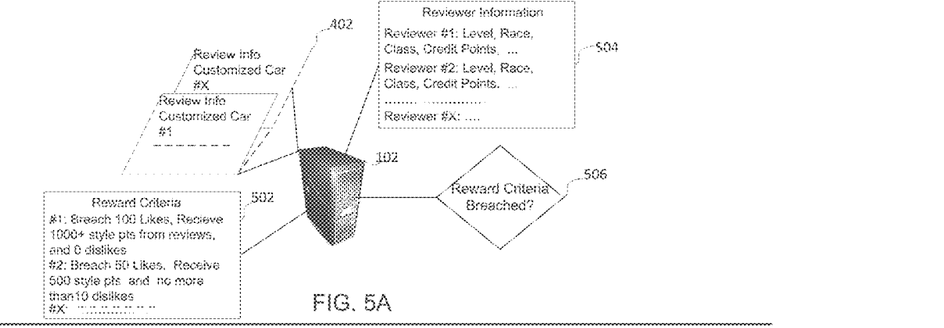
FIG. 5A illustrates one example of determining whether user reviews of a given customized virtual item has breached at least one reward criteria for a determination of a reward to be distributed to a user creator of the customized virtual item.

FIG. 5A illustrates one example of determining whether user reviews of a given customized virtual item has breached at least one reward criteria for a determination of a reward to be distributed to a user creator of the customized virtual item. It will be described with references to FIGS. 1 and 4. As shown in this example, one or more reward criteria 502 may be employed by the sever 102, e.g., the reward component 120 for determination whether user reviews of a given customized virtual item has breached at least one of the reward criteria 502. As shown in this example, a given reward criteria 502 may specify one or more threshold values for the reviews to achieve. As illustrated, the first reward criteria 502 in this example specifies that the reviews for a given customized virtual item should have more than 100 "likes" and 1000 style points assigned by the user reviewers, but may not have any "dislikes"; and the second reward criteria may similarly specify another set of thresholds which, as shown, are less strict than the counterparts in the first reward criteria 502.

As illustrated in FIG. 5, the server 102, for example via the reward component 120 described above may make a determination 506 determining whether the user reviews for a given customized virtual item has breached at least one of the reward criteria 502 shown in this example. As shown, such a determination may be based on review information indicating user reviews for the customized virtual item under review. As also shown in this example, the server 102 may make the determination 506 based on the user reviewer information 504 to weigh the reviews made by the individual user reviewers. As shown in this example, the user reviewer information 504 may include information indicating various aspects about a given user reviewer, such as, without limitation, the level of the given user reviewer in the virtual space, a race associated with the user reviewer, review credit score that have been assigned to the user reviewers and/or any other aspects that may be referenced by the server 102 for assessing user reviews made the respective user reviewers.

Figure 5B:
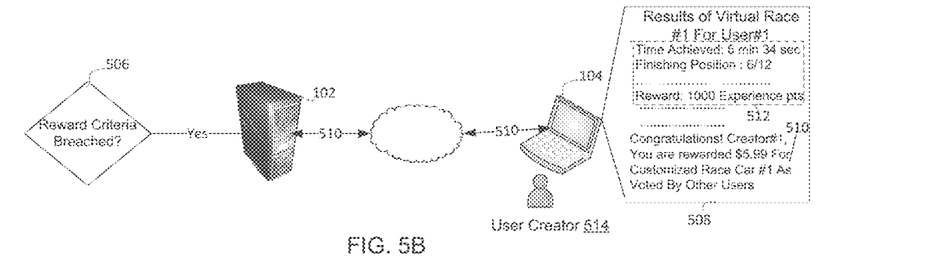
FIG. 5B illustrates an example of determining a reward for distribution to a user creator of customized virtual item in accordance with one embodiment of the disclosure.

FIG. 5B illustrates an example of determining a reward for distribution to a user creator of customized virtual item in accordance with one embodiment of the disclosure. As shown in this example, the determination 506 made by the server 102 may cause the server 102 to determine a reward for distribution to the creator 514 of the customized virtual item, for example via the reward component 120. As can be seen in this example, reward information 510 may be generated by the server 102 for presenting the determined reward in a user interface 508 implemented on the client computing platform 104 associated with the user creator 504. In this example, the user interface 508 is a result interface presenting a results achieved by the customized virtual car created by the user creator 514 in a virtual car race. As shown, the result of the virtual space race may include finish position, time and/or other race finish information 512 indicating results achieved by the customized virtual car in the virtual car race. It should be noted, as shown in this example, that the race information 512 may itself indicate a reward awarded to the user creator 514 for achieving the results shown in the virtual space race through the customized virtual space race car. As can be seen, reward information 510 may be presented in the virtual car race result interface 508 indicating a reward was determined based on the user reviews of the customized virtual space race car created by the user creator 514. As shown, such a reward may be separate and distinct from the race reward determined based on the finish information 512 regarding the customized virtual space race car.

Returning to FIG. 1, the server 102, client computing platforms 104, and/or external resources 106 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102, client computing platforms 104, and/or external resources 106 may be operatively linked via some other communication media.

A given client computing platform 104 may include one or more processors configured to execute computer program components. The computer program components may be configured to enable an expert or user associated with the given client computing platform 104 to interface with system 100 and/or external resources 106, and/or provide other functionality attributed herein to client computing platforms 104. By way of non-limiting example, the given client computing platform 104 may include one or more of a desktop computer, a laptop computer, a handheld computer, a tablet computing platform, a NetBook, a Smartphone, a gaming console, and/or other computing platforms.

The external resources 106 may include sources of information, hosts and/or providers of virtual environments outside of system 100, external entities participating with system 100, and/or other resources. In some implementations, some or all of the functionality attributed herein to external resources 106 may be provided by resources included in system 100.

The server 102 may include electronic storage 110, one or more processors 108, and/or other components. The server 102 may include communication lines, or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102. For example, server 102 may be implemented by a cloud of computing platforms operating together as server 102.

Electronic storage 110 may comprise electronic storage media that electronically stores information. The electronic storage media of electronic storage 110 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). Electronic storage 110 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 110 may include one or more virtual storage resources (e.g., cloud storage, a virtual private network, and/or other virtual storage resources). Electronic storage 110 may store software algorithms, information determined by processor 108, information received from server 102, information received from client computing platforms 104, and/or other information that enables server 102 to function as described herein.

Processor(s) 108 is configured to provide information processing capabilities in server 102. As such, processor 108 may include one or more of a digital processor, an analog processor, a digital circuit designed to process information, an analog circuit designed to process information, a state machine, and/or other mechanisms for electronically processing information. Although processor 108 is shown in FIG. 1 as a single entity, this is for illustrative purposes only.

In some implementations, processor 108 may include a plurality of processing units. These processing units may be physically located within the same device, or processor 108 may represent processing functionality of a plurality of devices operating in coordination. The processor 108 may be configured to execute components 112, 114, 116, 118, 120. Processor 108 may be configured to execute components 112, 114, 116, 118, 120 by software; hardware; firmware; some combination of software, hardware, and/or firmware; and/or other mechanisms for configuring processing capabilities on processor 108.

It should be appreciated that although components 112, 114, 116, 118, 120 are illustrated in FIG. 1 as being co-located within a single processing unit, in implementations in which processor 108 includes multiple processing units, one or more of components 112, 114, 116, 118, 120 may be located remotely from the other components. The description of the functionality provided by the different components 112, 114, 116, 118, 120 described below is for illustrative purposes, and is not intended to be limiting, as any of components 112, 114, 116, 118, 120 may provide more or less functionality than is described. For example, one or more of components 112, 114, 116, 118, 120 may be eliminated, and some or all of its functionality may be provided by other ones of components 112, 114, 116, 118, 120. As another example, processor 108 may be configured to execute one or more additional components that may perform some or all of the functionality attributed below to one of components 112, 114, 116, 118, 120.

Figure 6:
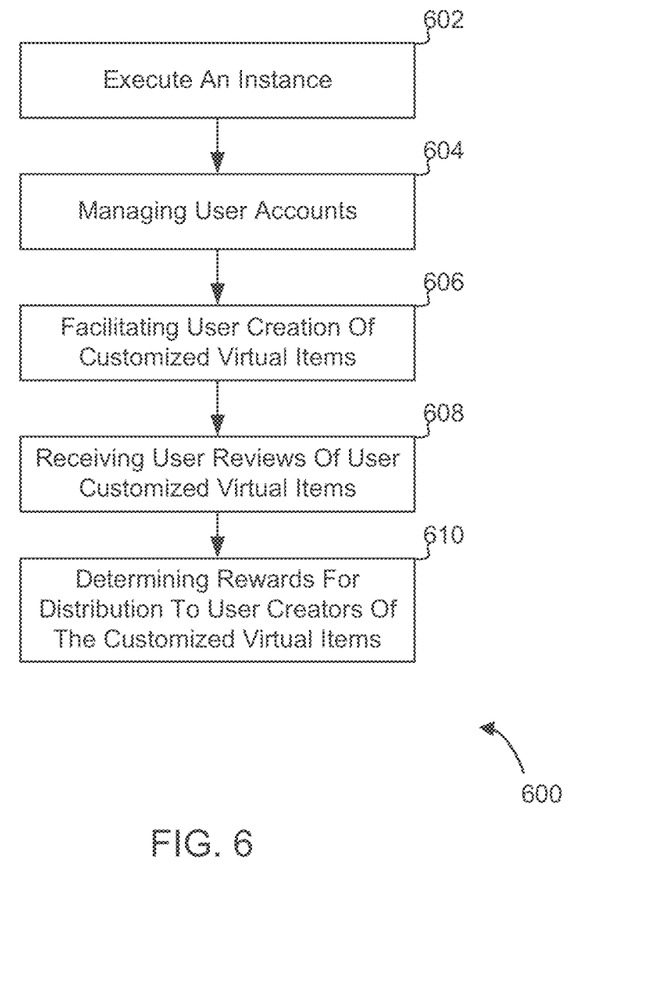
FIG. 6 illustrates one exemplary method for rewarding user created customized virtual items based on user reviews in accordance with the disclosure.

FIG. 6 illustrates one exemplary method 600 for rewarding user created customized virtual items based on user reviews in accordance with the disclosure. The operations of method 600 presented below are intended to be illustrative. In some embodiments, method 600 may be accomplished with one or more additional operations not described, and/or without one or more of the operations discussed. Additionally, the order in which the operations of method 600 are illustrated in FIG. 6 and described below is not intended to be limiting.

In some embodiments, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

At an operation 602, an instance of a virtual space may be executed and implemented to determine view information for transmission to one or more client computing platforms associated with users. The users may interact with the virtual space by initiating virtual space commands to perform user actions. The user actions may be executed in the virtual space. In some implementations, operation 602 may be performed by a space component the same as or similar to space component 112 (shown in FIG. 1 and described herein).

At an operation 604, user accounts associated with the users may be managed. The user accounts may include a first account associated with the first user. The first account may include an inventory of virtual items for the first user. In some implementations, operation 604 may be performed by a user component the same as or similar to user component 114 (shown in FIG. 1 and described herein).

At operation 606, user creation of customized virtual items may be facilitated. The user creation of customized virtual items may be facilitated by providing virtual tools, templates, models, parts, and/or other resources to enable users to customize the virtual items by augmenting the virtual items. In some implementations, the virtual item customization component may be configured to facilitate users to customize virtual space race cars in the virtual space. In some implementations, operation 606 may be performed by a virtual item customization component the same as or similar to virtual item customization component 116 (shown in FIG. 1 and described herein).

At an operation 608, reviews of a given user created customized virtual item may be received. The reviews received in operation 608 may include reviews made by fellow users of virtual space other than the user creator that created the given customized virtual item for which the user reviews are received. In some examples, the reviews received in operation 608 may include those for a given customized virtual space race car. In those examples, the received reviews may include those made by participants of virtual car races in the virtual space. Such reviews may be received from such participants during, at conclusion, and/or after the virtual car races. In some implementations, operation 608 may be performed by a virtual item review component the same as or similar to space component virtual item review component 118 (shown in FIG. 1 and described herein).

At an operation 610, one or more rewards may be determined for distribution to a user creator of the given virtual space race car for which user reviews are received in operation 608 may be determined based on the user reviews received in operation 608. The reward(s) determined in operation 608 may include an amount of virtual currencies, real-world money credit, virtual items, virtual resources, and/or any other type of rewards. The determination performed by operation 608 may be based on the received reviews breaching one or more reward criteria. The reward criteria may include a number of votes indicating the user reviewers like the given customized virtual items, a number of threshold score, rating, ranking, points, and/or any other reward criteria. In some implementations, operation 610 may be performed by a reward component the same as or similar to reward component 120 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for rewarding user customization of virtual items in an virtual space, the system comprising
one or more physical processors configured by non-transitory computer readable instructions to:
execute an instance of the virtual space in which an online game takes place, to use the instance of the virtual space to generate game state information that is transmitted to client computing platforms over a network, and to facilitate presentation of the virtual space to users on client computing platforms associated users by causing displays associated with the client computing platforms to present views of the game space, and to execute actions in the instance of the virtual space in response to reception of commands from over the network from the client computing platforms associated with the users to facilitate interaction of the users with the virtual space and/or each other;

manage user accounts comprising user information associated with individual users, such user information including inventories of virtual items available to the individual users in the virtual space, the user accounts including a first user account associated with a first user, the first user account including a first inventory of virtual items available to the first user in the virtual space;

facilitate user creation of customized virtual items using virtual items in the user inventories associated with the users such that creation by the first user of a first customized virtual item using a first virtual item in the first inventory is facilitated;

receive, over the network, user reviews of user customized virtual items, the user reviews being made by users of the virtual space such that the received reviews include a first set of user reviews of the first customized virtual items received from user reviewers other than the first user; and determine rewards for distribution to user creators of the customized virtual items based on the user reviews received such that a first reward, for the first user, is determined based on the first set of user reviews.

2. The system of claim 1, wherein the one or more physical processors are further configured by computer readable instructions such that the first set of user reviews include votes submitted by user reviewers indicating whether the user reviewers like or dislike the first customized virtual item, and wherein the first reward is determined based on a number of votes indicating user reviewers who submitted the number of votes like the first customized virtual item.

3. The system of claim 1, wherein the one or more physical processors are further configured by computer readable instructions such that a given one of the first set of reviews comprises review contents corresponding to one or more review parameters, the review parameters including a rating parameter specifying a user rating, a ranking specifying a user ranking, a score parameter specifying a user generated score, and/or a style rating for specifying a user rating of a style for the first customized virtual item.

4. The system of claim 1, wherein the one or more physical processors are further configured by computer readable instructions such that the first reward includes an amount of virtual currencies, an amount of real-world money credits, and/or a virtual item usable in the virtual space.

5. The system of claim 1, wherein the one or more physical processors are further configured by computer readable instructions such that the determination of the first reward includes a determination whether the first set of user reviews breaches one or more reward criteria associated with the first reward.

6. The system of claim 5, wherein the one or more physical processors are further configured by computer readable instructions such that the determination whether the first set of user reviews breaches one or more reward criteria associated with first reward includes assessing the first set of user reviews based on reviewer aspects associated with the user reviewers that made the first set of user reviews, wherein the reviewer aspects associated with a given one of the user reviewers include a review credit score based on historical reviews made by the given one of the user reviewer.

7. The system of claim 1, wherein the one or more physical processors are further configured by computer readable instructions such that the first customized virtual item includes a first customized virtual space race car created by the first user.

8. The system of claim 7, wherein the one or more physical processors are further configured by computer readable instructions such that the first set of reviews include reviews of the first customized virtual space race car created by the first user, the reviews being made by participants of a virtual space car race in which the first customized virtual space race car competes.

9. The system of claim 8, wherein the one or more physical processors are further configured by computer readable instructions such that the first reward includes a bonus reward separate and distinct from a reward rewarding the first user for achieving a finish position with the first customized virtual space race car in the virtual space race.

10. A method for rewarding user customization of virtual items in an virtual space, the method being implemented by one or more physical processors configured by non-transitory computer readable instructions, the method comprising executing, by the one or more physical processors, an instance of the virtual space in which an online game takes place;

using, by the one or more physical processors, the instance of the virtual space to generate game state information that is transmitted to client computing platforms over a network, and to facilitate presentation of the virtual space to users on client computing platforms associated users by causing displays associated with the client computing platforms to present views of the game space and executing actions in the instance of the virtual space in response to reception of commands from over the network from the client computing platforms associated with the users to facilitate interaction of the users with the virtual space and/or each other;

managing, by the one or more physical processors, user accounts comprising user information associated with individual users, such user information including inventories of virtual items available to the individual users in the virtual space, the user accounts including a first user account associated with a first user, the first user account including a first inventory of virtual items available to the first user in the virtual space;

facilitating, by the one or more physical processors, user creation of customized virtual items using virtual items in the user inventories associated with the users such that facilitating creation by the first user of a first customized virtual item using a first virtual item in the first inventory;

receiving, at the one or more physical processors, over the network, user reviews of user customized virtual items, the user reviews being made by user of the virtual space such that the received reviews include a first set of user reviews of the first customized virtual items received from user reviewers other than the first user; and determining, by the one or more physical processors, rewards for distribution to user creators of the customized virtual items based on the received user reviews such that determining, for the first user, a first reward based on the first set of user reviews.

11. The method of claim 10, wherein the first set of user reviews include votes submitted by user reviewers indicating whether the user reviewers like or dislike the first customized virtual item, and wherein the first reward is determined based on a number of votes indicating user reviewers who submitted the number of votes like the first customized virtual item.

12. The method of claim 10, wherein a given one of the first set of reviews comprises review contents corresponding to one or more review parameters, the review parameters including a rating parameter specifying a user rating, a ranking specifying a user ranking, a score parameter specifying a user generated score, and/or a style rating for specifying a user rating of a style for the first customized virtual item.

13. The method of claim 10, wherein the first reward includes an amount of virtual currencies, an amount of real-world money credits, and/or a virtual item usable in the virtual space.

14. The method of claim 10, wherein the determination of the first reward includes a determination whether the first set of user reviews breaches one or more reward criteria associated with the first reward.

15. The method of claim 14, wherein the determination whether the first set of user reviews breaches one or more reward criteria associated with first reward includes assessing the first set of user reviews based on reviewer aspects associated with the user reviewers that made the first set of user reviews, wherein the reviewer aspects associated with a given one of the user reviewers include a review credit score based on historical reviews made by the given one of the user reviewer.

16. The method of claim 10, wherein the first customized virtual item includes a first customized virtual space race car created by the first user.

17. The method of claim 16, wherein the first set of reviews include reviews of the first customized virtual space race car created by the first user, the reviews being made by participants of a virtual space car race in which the first customized virtual space race car competes.

18. The method of claim 17, wherein the first reward includes a bonus reward separate and distinct from a reward rewarding the first user for achieving a finish position with the first customized virtual space race car in the virtual space race.

* * * * *